(12) United States Patent
Brossier et al.

(10) Patent No.: US 7,187,717 B2
(45) Date of Patent: Mar. 6, 2007

(54) PROCESS FOR MODULATION AND DETERMINATION OF THE BIT LOADING ON A TRANSMISSION CHANNEL

(75) Inventors: Jean-Marc Brossier, Saint Martin d'Heres (FR); Frédéric Lehmann, San Diego, CA (US)

(73) Assignee: STMicroelectronics S.A., Montrouge (FR)

( * ) Notice: Subject to any disclaimer, the term of this patent is extended or adjusted under 35 U.S.C. 154(b) by 744 days.

(21) Appl. No.: 10/386,123

(22) Filed: Mar. 10, 2003

(65) Prior Publication Data

US 2004/0039983 A1 Feb. 26, 2004

(30) Foreign Application Priority Data

Mar. 11, 2002 (FR) ................................. 02 02981

(51) Int. Cl.
*H04K 1/10* (2006.01)
*H04L 27/28* (2006.01)

(52) U.S. Cl. ...................... 375/260; 375/285; 375/296; 375/265

(58) Field of Classification Search ................ 375/285, 375/296, 260, 265, 262, 341, 261
See application file for complete search history.

(56) References Cited

U.S. PATENT DOCUMENTS 6,084,919 A * 7/2000 Kleider et al. .............. 375/285
6,243,414 B1 * 6/2001 Drucker et al. ............. 375/222
6,351,499 B1 * 2/2002 Paulraj et al. .............. 375/267
6,788,737 B1 * 9/2004 Miyoshi et al. ............ 375/219
6,940,915 B2 * 9/2005 Tang ........................ 375/261

FOREIGN PATENT DOCUMENTS

EP 0 903 883 A2 3/1999

OTHER PUBLICATIONS

Caire, G. et al., "Bit-Interleaved Coded Modulation," *IEEE Transactions on Information Theory*, 44(3):927-946, May 1998.
Lau, V. , "Performance of Variable Rate Bit Interleaved Coding for High Bandwidth Efficiency," in *Proceedings of IEEE 51st Vehicular Technology Conference*, Tokyo, Japan, May 15-18, 2000, pp. 2054-2058.

* cited by examiner

*Primary Examiner*—Phuong Phu
(74) *Attorney, Agent, or Firm*—Lisa K. Jorgenson; Dennis M. de Guzman; Seed IP Law Group PLLC (57) ABSTRACT

A modulation process for a digital transmission system having an error correcting code and determination of the number of bits to load on a transmission channel. The process judiciously associates a coder for introducing redundancy to the binary information, an interleaver for suppression the correlation to the encoded information and a labeling of the same based on a GRAY type coding in order to associate the said binary information with points of a constellation which is selected among a predetermined set of constellations. The process achieves a precise determination of the order and size of the constellation to utilize and, therefore, the computation of the bit loading as a function of the signal to noise ratio measured in reception and as a function of the bit error rate $P_{bit}$ at the output of the receiver. The process is well adapted to the Multi Tone transmission system, and to the use of turbo codes.

20 Claims, 4 Drawing Sheets

| b | $d_b^2$ | $b \cdot K_b$ |
|---|---|---|
| 1 | 4 | 1 |
| 2 | 2 | 2 |
| 3 | 4/6 | 2.5 |
| 4 | 4/10 | 3 |
| 5 | 4/20 | 3.75 |
| 6 | 4/42 | 3.5 |
| 7 | 4/82 | 3.875 |
| 8 | 4/170 | 3.75 |
| 9 | 4/330 | 3.9375 |
| 10 | 4/682 | 3.875 |
| 11 | 4/1322 | 3.96875 |
| 12 | 4/2730 | 3.9375 |
| 13 | 4/5290 | 3.984375 |
| 14 | 4/10922 | 3.96875 |
| 15 | 4/21162 | 3.992188 |

FIG. 4

PROCESS FOR MODULATION AND DETERMINATION OF THE BIT LOADING ON A TRANSMISSION CHANNEL

BACKGROUND OF THE INVENTION

1. Field of the Invention

The present invention relates to the field of digital transmission of data and more particularly to a process for modulation and for determining the bit loading on a communication channel.

2. Description of the Related Art

As communication networks are constantly developing, techniques of modulation need to be more and more effective so as to increase the data rate of the communications.

Figure 1A:
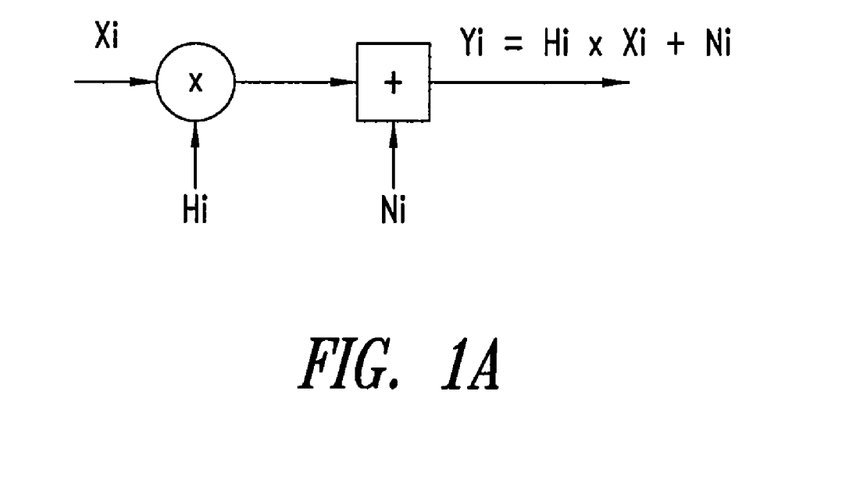
FIG. 1A illustrates the effect resulting from a Additive White Gaussian Noise (AWGN) channel on a digital signal.

FIG. 1A illustrates the transmission of a digital signal $X_i$ through a Additive White Gaussian Noise (AWGN) channel. In this situation, the input signal $x_i$ undergoes the effect of a complex gain $H_i$ associated to a white noise $n_i$ of variance $N_i$.

$$y_i = H_i x_i + n_i$$

Figure 1B:
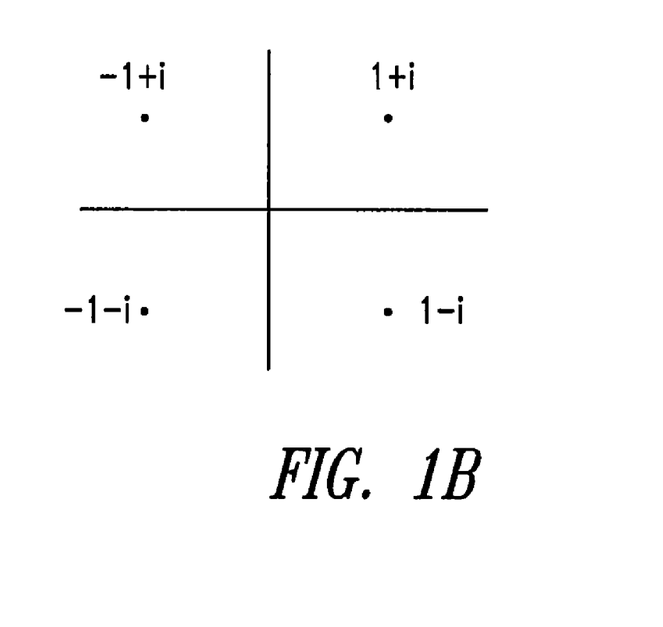
FIG. 1B is an illustration of a 4QAM constellation.

The input signal $x_i$ is defined in accordance with the modulation scheme retained. It belongs to a predefined set—or constellation—of complex numbers. In the so-called Binary Phase Shift Keying (B.P.S.K.) modulation, the constellation comprises the two values, −1 and +1 respectively and, in a four states Quadrature Amplitude Modulation or 4QAM such as illustrated in FIG. 1B—the constellation comprises a set of four complex points.

The modulation of the signal to be transmitted requires an operation known as labeling or mapping, which comprises the establishment of a direct and unique relation between the signal composed of symbols or words which are to be transmitted and the different points forming the constellation. In a 4QAM modulation, four 2-bit words are associated to each point of the constellation so as two bits can be simultaneously transmitted through the communication channel.

For static or quasi-statics transmission channels, the choice of the constellation—and thus the number of bits simultaneously transmitted on the channel—is chosen as a function of the characteristics of the channel which are measured, generally before the start of the transmission, by a direct measure of the signal to noise ratio after the establishment of the channel. The number of bits which can be loaded on the channel—or the order or size of the constellation—is set to a high value when the signal to noise ratio shows to be favorable. In practice, the size of the constellation is determined as a function of the characteristics of the channel, assumed static or quasi-static—derived from the measurement of the received signal to noise ratio measured in reception and returned to the emitter before the start of the transmission so as to set the order of the constellation. In a Orthogonal Frequency Duplex Modulation (OFDM) or Discrete Multi-Tone (DMT) communication system, a number of subcarriers are associated and different signals can be added, each signal being translated to one particular frequency or subcarrier. The size of the constellation is set in accordance with the response of the channel for the particular frequency of the subcarrier which is considered. Thus the subcarrier with the more favorable signal to noise ratio will be associated to a constellation of high size—up to fifteen bits which are parallely transmitted—while the less favorable subcarriers will correspond to low size constellations.

To one constellation will correspond a number of bits which are simultaneously transmitted through the channel. A digital transmission system—as known in the art—will use a constellation with a given s corresponding bitloading—which is determined for each subcarrier. In practice, for each channel (or subcarrier), there is determined the higher size of the constellation which, for a standardized emission power of 1, provides with an error bit rate below to a given threshold, for instance $10^{-4}$. The bitloading then derives from the constellation.

The following formula is known for determining the number of bits to use for one subcarrier in the case where no error correcting technique is used:

$$b = \log_2(M) = \log_2\left(1 + \frac{SNR_{out}}{\Gamma}\right)$$

with $$SNR_{out} = \frac{|H_i|^2}{N_i}$$

being the signal to noise ratio at the output of the channel, and $\Gamma$ corresponding to a performance level representative of the probability $P_{bit}$ that an error occurs in reception. Briefly, in accordance with this value $\Gamma$ and also the signal to noise ratio $SNR_{out}$, the size of the constellation can be precisely adjusted, and therefore the bitloading for the considered channel.

Thus, the bitloading is classically determined by the measurement of the signal to noise ratio in reception. If this determination shows to be satisfactory for transmission systems without error correcting technique, the determination is much more complex when an error correcting code is introduced within the modulation scheme, such as a Reed-Solomon code for instance. In that case, the symbols which are uniquely associated to the points of the constellation by means of the labeling operation do no longer consist in unpredictable information, but also comprises redundant information which depends on the error correcting coded utilized.

The computation of the size of the constellation to utilize—and therefore the bitloading within the channel—is clearly more difficult. This problem is usually solved by means of an intermediary calculation, based on the use of a coding gain resulting from the error correcting code. This permits to reduce the problem to the theoretical and ideal situation of a modulation without coding so as to take advantage of the existing formulas for determining the constellation and computing the bitloading. For an bit error rate of $10^{-7}$ for instance with coding, the corresponding bit error rate without coder is computed, for instance $_{10^{-4}}$, and the last value is then used for determined the appropriate constellation as well as the bitloading on the channel.

As can be seen, this computation—although widely used in the art—is clearly an empirical approach which prevents precision in the determination of the constellation. More generally, modulation systems using error correcting codes do not easily permit the determination of the bit loading.

There is a need for a new structure of modulator which fits the use of error correcting code and which still permits the determination of the bitloading to be used in one or more transmission channels. Particularly, it is desirable to achieve a new algorithm which achieves the determination of the constellation to utilize and which is adapted to the use of an error correcting code.

BRIEF SUMMARY OF THE INVENTION

An embodiment of the present invention carries out a process for determining the order or size of the constellation to use in a modulation system, the process being adapted to the use of an error correcting code.

Another embodiment of the present invention achieves a new structure of modulator which is adapted to the use of an error correcting code and to the determination of the order of the constellation to use.

One embodiment of the invention provides these features by means of a process for modulation for a digital transmission system with an error correcting code which involves the determination of the bit loading to use on a channel or carrier. The process involves:

using an encoder for adding redundancy to the binary information elements;

using an interleaver for suppressing the correlation between said encoded binary information elements;

labeling the interleaved elements with a Gray-type coding so as to associate said elements with points of constellation selected from one predetermined sets of constellations.

The process achieves a precise determination of the order of the constellation to use and the bitloading corresponding to one channel in response to the measurement in reception of the signal to noise ratio and according to a bit error rate $P_{bit}$ at the output of the receiver. The process is well adapted to the realization of Discrete MultiTone (D.M.T.) based communication systems and match the use of turbo codes.

The use of an interleaver—which is classically utilized in digital transmission on dynamic channels, such as radio transmission, shows to be of a great advantage for communication systems for static channels. Indeed, it permits a direct relation to be established between the post-decoding binary error rate in the receiver in accordance with the signal to noise ratio in the receiver and, therefore, permits to calculate with ease the number of bits to use through the transmission channel.

Therefore, a precise determination of the constellation can be achieved without need to the artificial use of a coding gain as known in the prior art technique.

In an embodiment, there is used a hard code C(n,k,t) over a Galois field of m elements GF(m), producing n symbols from k information symbols and having a correction power of t. The three following formulas permits to establish a direct relation between the post-decoding bit error rate $P_{bit}$ and the error bit rate p at the output of the demodulator, and thus to select the constellation to use for one channel:

$$P_s = 1 - (1-p)^m$$

$$P_d = \sum_{i=t+1}^{n} \frac{i}{n}\binom{n}{i}P_s^i(1-P_s)^{n-i}$$

$$P_{bit} = 1 - (1-P_d)^{\frac{1}{m}}.$$

In an embodiment, a set of look-up tables will be used for embodying those formulas, and the precise determination of the constellation is achieved by means of maximizing the following expression:

$$b_i = \max\left\{1 \leq b \leq b_{\max} : K_b Q\left(\sqrt{\frac{d_b^2|H_i|_i^2}{2N_i}}\right) \leq p\right\}.$$

Figure 4:
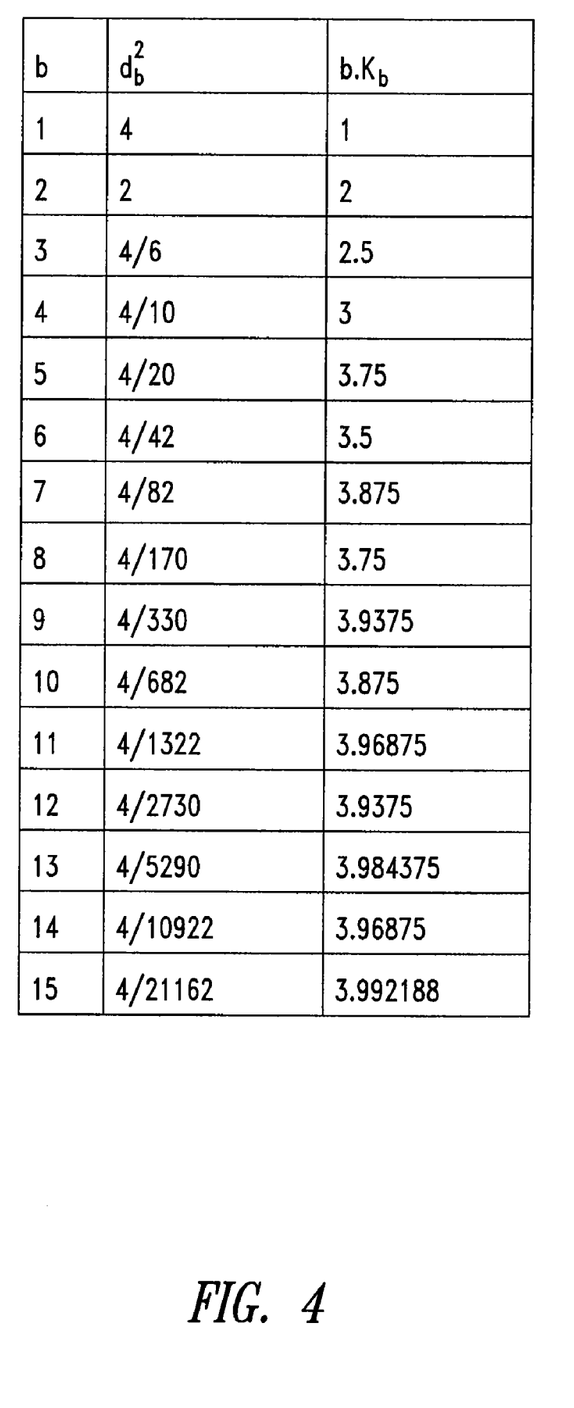
FIG. 4 shows a table giving example correspondence between the Euclidian distance and the average error rates for constellations of the standard type QAM with a GRAY labeling.

FIG. 4 particularly shows example values for $K_b$ and $d_b^2$.

A Reed Solomon code is used in one embodiment.

An embodiment of the invention also matches the use of soft codes C(n,k) over GF(2) and the corresponding soft input maximum likelihood decoder. The use of the interleaver permits to derive, as above in the case of a hard code, a direct relation between the post-decoding error bit rate $P_{bit}$ and the bit rate at the output of the demodulator. Again, the size of the constellation can be derived from the maximization of one criterium.

One embodiment of the invention is well suited for the realization of mono or Discrete Multi Tone (D.M.T.) communication systems.

BRIEF DESCRIPTION OF THE SEVERAL VIEWS OF THE DRAWINGS

Further features of embodiments of the invention will become apparent when reading the following description and its accompanying drawings, provided by way of example only, where.

DETAILED DESCRIPTION OF THE INVENTION

Embodiments of a process for modulation and determination of the bit loading on a transmission channel are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
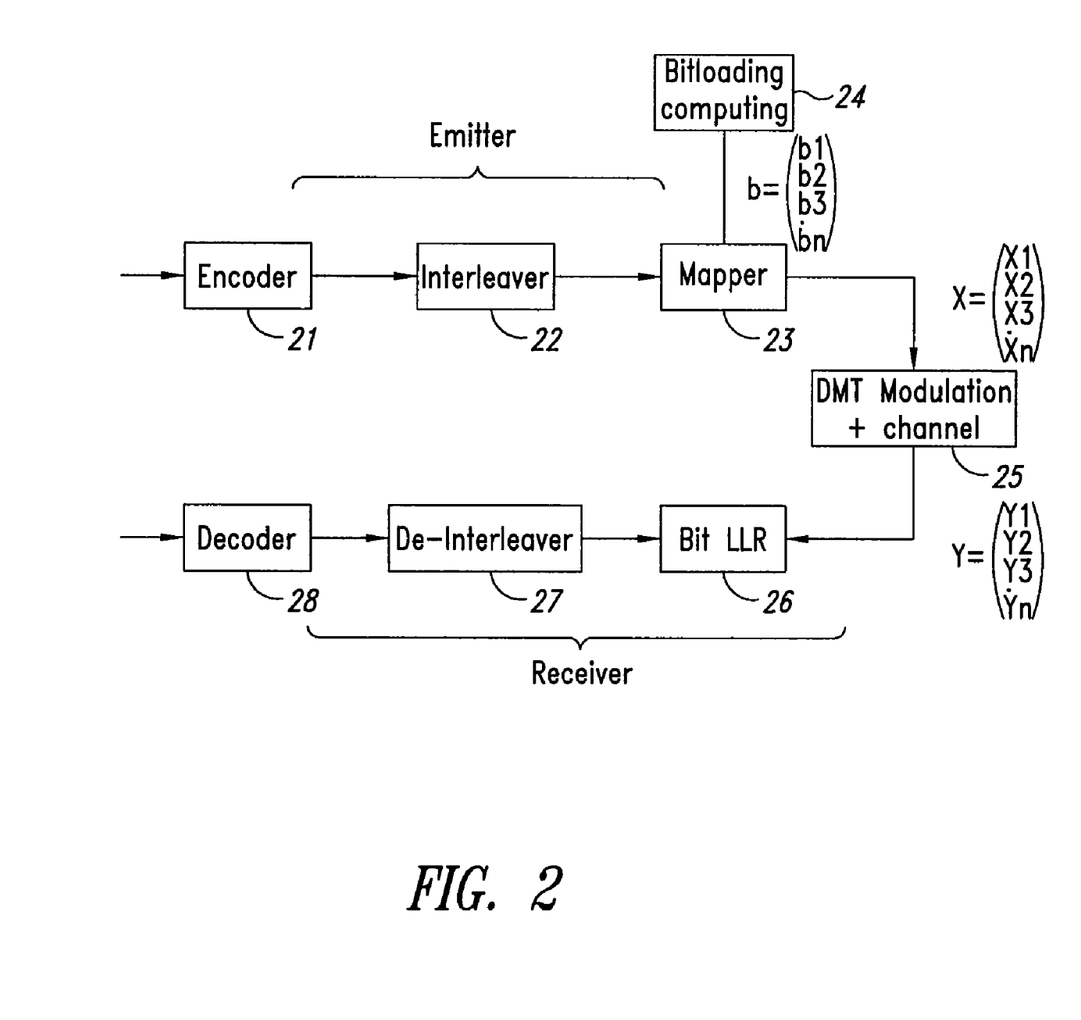
FIG. 2 shows an embodiment of a modulator/demodulator in accordance with the present invention.

With respect to FIG. 2, there is shown a modulation-demodulation chain which is adapted to the use of an error correcting code and to the computation of the bitloading associated with one subchannel or subcarrier.

In order to exemplify the general applicability of the method, the description will refer to the use of Orthogonal Frequency Duplex Modulation (OFDM) or Discrete Multi-Tone (DMT). Clearly, this is only one example of realization and the skilled man of the art will advantageously adapt the process of the invention to a modulation scheme with one unique carrier. Similarly, the case of a Asynchronous Digital Subscriber Line (A.D.S.L.) or Very-high-bit-rate Digital Subscriber Line (V.D.S.L.) and more generally xD.S.L transmissions can be in nonrestrictively considered and the teachings of the present invention will be applicable to all kinds of channels: telecommunication, satellite communication, optic fiber communications etc.

The modulation path comprises a binary encoder 21 for inserting redundancy for the purpose of error correcting. Particularly, any error correcting code can be considered such as Reed-Solomon, Bose Chaudhury Hocquenghem (BCH), Low-Density Parity-Check (LDPC), and also convolutive codes and turbo codes and principles.

At the output of binary encoder 21, the binary elements are processed by an interleaver 22 which permits to modify the sequence of the bits and to suppress and correlating introduced by encoding and modulation. To achieve this, the length of the interleaving is set to a sufficient value. The use of an interleaver is referred to as Bit Interleaving Coded Modulation (B.I.C.M.) which is a recent technique designed for the transmission through dynamic channels, such as for radio transmissions. The technique permits the error correcting codes to reconstruct the signal even if, during a short instant, a sequence of bits is lost due to radio interferences. More information about this recent technique can be found in the publications of M. ZEHAVI et CAIRE and particularly the publication <<*Bit-interleaved coded modulation*>> in IEEE Trans. Inf. Theory, vol. 44, no 4, pp. 932–946, May 1988.

In an embodiment of this invention, the technique is applied to the case of static channels so as to optimize the computing of the appropriate constellation to associate with each subcarrier.

At the output of the interleaver 22, the bits are entered into a mapper 23 which computes a QAM complex vector $x=(x_1, \ldots, x_N)$, wherein N represents the number of subcarriers. A Bit Loading computing block 24 executes an algorithm for determining the order of the constellation and provides with a vector $b=(b_1, \ldots, b_N)$, which comprises the number of bits which the mapper 23 will assign to every subcarrier. The man qualified in the art having the benefit of this disclosure will straightforwardly adapt the structure to fit any transmission with n parallel channels—particularly vectorial demodulation and also M-ary orthogonal signaling, or Frequency Division Multiplexing (F.D.M.) applications. Applying the teachings of the invention to the DMT is clearly only an example of one embodiment.

Every element $x_i$ corresponds to one specific point in one constellation QAM of size $2^{b_i}$. Assuming that the Inter Symbol Interference (I.S.I) can be suppressed by means of a cyclic prefix having a length which has a similar value than the channel impulse response, as is known by the skilled man, the output signal $y=(y_1, \ldots, y_N)$ of the DMT demodulator—illustrated by block 25 in FIG. 2—is given by the following formula:

$$y_i = H_i x_i + n_i, \; i=1, \ldots, N,$$

Wherein $H_i$ corresponds to the channel frequency response, and $n_i$ the noise part for the ith subcarrier.

Considering the receiver, e.g., the bottom part of FIG. 2, the computation of the likehood ratio is performed by means of a Logarithmic Likehood Ratio (L.L.R.) block 26. Such a calculation is well known to the skilled man and will not be further developed. The bits are then de-interleaved by means of de-interleaver 27, then processed by decoder 38 of the same type than encoder 21 in order to restore the original information bits elements. It should be noted that, in an embodiment, block 26 is used for producing likehood information which can be used for soft error correcting codes, such as turbo codes.

Encoder 21 and decoder 28 are any type of elements of a error correcting system, such as a Reed Solomon one.

An embodiment of the invention is well suited for a static transmission channel, having a constant $H_i$. The formulas which are given below refer to a Additive White Gaussian Noise (AWGN) having a variance equal to $N_i$. A GRAY type labeling is used within block 23 which, as will be described, provides very good results.

Figure 3:
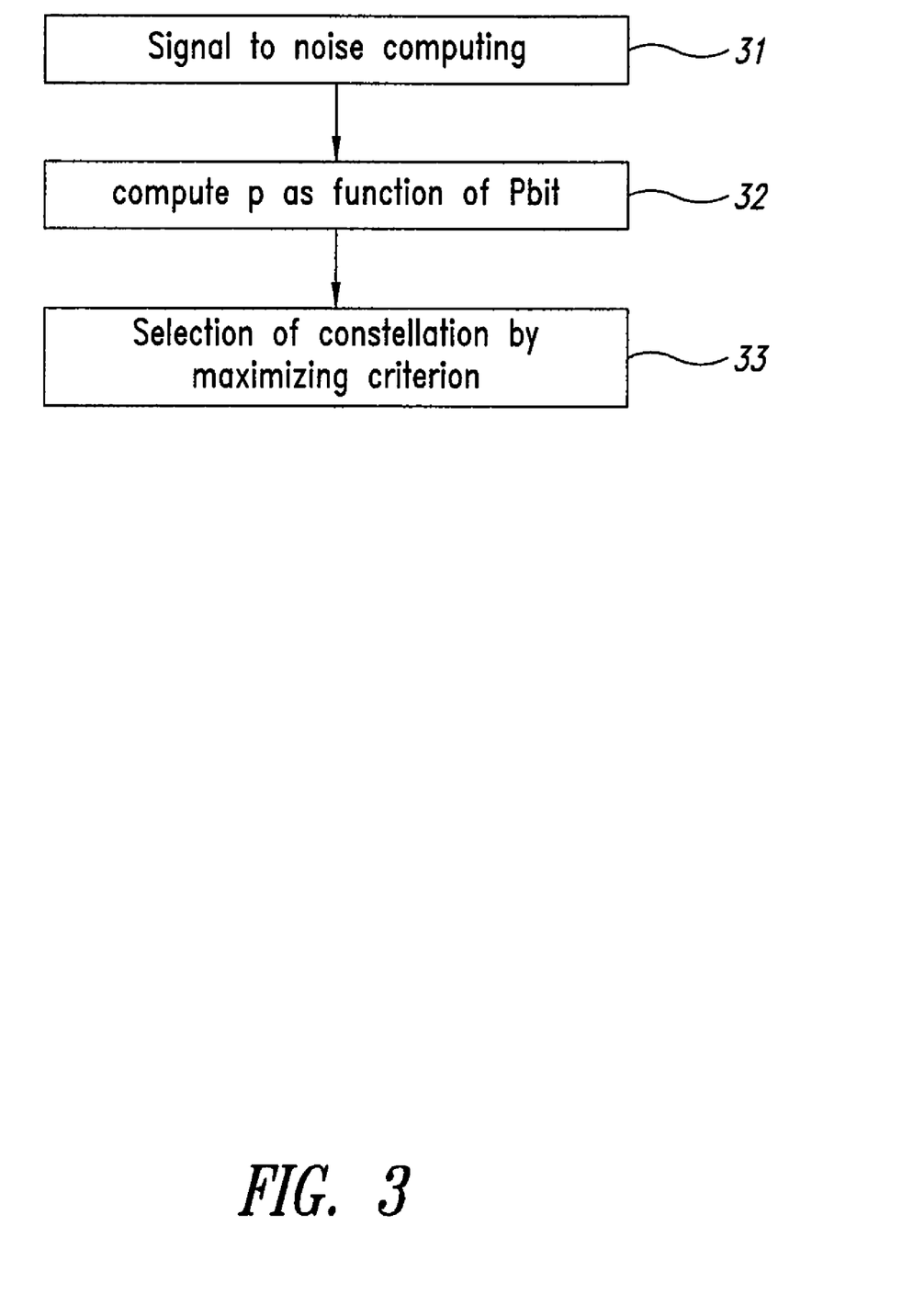
FIG. 3 illustrates the process for computing the bit loading on the transmission channel in accordance with an embodiment of the invention.

With reference to FIG. 3, it will now be described how to compute vector $b=(b_1, \ldots, b_N)$ within block 24, in accordance with the measurement of the signal to noise ratio, in reception, and also as a function of the post-decoder error bit rate $P_{bit}$.

The computing process of the bitloading starts with the measurement, in a step 31, of the signal to noise ratio in reception, which is defined as being equal to $|H_i|^2/N_i$ for the ith subcarrier, and which is classically computed by means of a predetermined sequence of predetermined symbols, known to both the emitter and the receiver. As known in the art, $|H_i|^2$ is the squared modulus of the expectation of the received $y_i$ and $N_i$ represents their variance.

In a step 32, the raw error rate is then computed. This is achieved by means of a non linear computation, based on a lookup table, defining the raw bit error rate p at the demodulator output as a function of the post-decoding bit error rate $P_{bit}$, which is a measurement of the quality of service for the communication system.

The concrete way to compute p as a function of $P_{bit}$ depends on the type of decoder which is used.

For a decoder of a <<hard>> type, which only receives discrete values (0, 1) for the received bits, such as a Reed Solomon decoder for instance, the parameter p is computed as follows. Assuming that a code C(n,k,t) is used, generating n bits from k information bits with a correction power equal to t. The code is typically generated over a Galois Field having m elements. As known by the skilled man having the benefit of this disclosure, codes which directly code information bits can be utilized and also codes which group bits per packets, as for the Reed Solomon code. The formulas which are given below permit a direct relationship to be established between the post-decode error bit rate $P_{bit}$ and the error rate p at the output of the demodulator:

$$P_s = 1 - (1-p)^m$$

$$P_d = \sum_{i=t+1}^{n} \frac{i}{n} \binom{n}{i} P_s^i (1-P_s)^{n-i}$$

$$P_{bit} = 1 - (1-P_d)^{\frac{1}{m}}.$$

The computing of step 32 can be easily achieved by means of a first look-up table giving a relation between post-decoding bit error rate $P_{bit}$ and the error bit rate p at the output of the demodulator.

It will now be described how to determine the relationship between the two variables $P_{bit}$ and p when the decoder is of a "soft" type, such as a turbo-decoder using real values at the input. Assuming that one generally uses a code C(n,k) over a Galois Field GF(2) with two elements and the corresponding soft input maximum likehood decoder.

Assuming that $$A(W, H) = \sum_{h=d\min}^{n} \sum_{w=1}^{h} A_{w,h} W^w H^h$$

is the input output weight enumerating function (IOWEF) and if $d_{min}$ is the minimum Hamming distance between two words of the code. In this case, $A_{w,h}$ represents the number of code words with Hamming weight h generated by information word of weight w.

The following formula can thus be established between p and $P_{bit}$:

$$P_{bit} \approx \frac{1}{k} Q(\sqrt{-2d_{\min}\ln p}) p^{-d\min} \frac{\partial A(W, H)}{\partial W}\bigg|_{W=1, H=p},$$

with $Q(x) = \int_{x}^{+\infty} \frac{1}{\sqrt{2\pi}} \exp\left(-\frac{t^2}{2}\right) dt.$ It can be seen that a direct relationship can be established, thanks to the interleaver 22 and to the de-interleaver 27, between the post-decode bit error rate $P_{bit}$ and the error rate p at the output of the demodulator.

It is then possible to directly derive the latter from a second look-up table between the two variables. Typically, the calculation step 32 can be applied to convolutive codes with a VITERBI decoding, for binary BCH codes with CHASE decoding and still for a turbo decoding of BCH code products.

When the computation of p performed in step 32 is completed, the selection of the constellation to use for the considered channel or subcarrier is performed in a step 33. This is achieved, again, by means of a look-up table which permits, in accordance with the values of p et SNR which are respectively calculated and measured as explained above, the number of bits to be loaded on each subcarrier.

In practice, this step is embodied by means of a maximizing loop. Let us consider a number of QAM constellations having a size of $2^b$, b=1 to $b_{max}$. Considering that $d_b^2$ is the squared minimum Euclidian distance between the points of the constellation and $b.K_b$ is the average number of binary errors due to the minimum Euclidian distance error events.

The table shown in FIG. 4 gives the value of $d_b^2$ and $b.K_b$ for $b_{max}=15$.

In the case of a hard type decoder, the value of $b_i$ is maximized in the following manner:

$$b_i = \max\left\{1 \leq b \leq b_{\max} : K_b Q\left(\sqrt{\frac{d_b^2 |H_i|^2}{2N_i}}\right) \leq p\right\}.$$

For a soft type decoder, the following value is maximized:

$$b_i = \max\left\{1 \leq b \leq b_{\max} : \exp\left(-\frac{d_b^2 |H_i|^2}{2N_i}\right) \leq p\right\}.$$

It can be seen that, by using an interleaver within the modulation scheme for transmission through a static channel—while this interleaver is classically reserved for dynamic channels such as in radio transmissions. it is surprisingly observed that a direct relationship can be established between the bit error and the signal to noise ratio thanks to the use of interleaver 22 and, therefore, the computing of the bit loading can be achieved in a novel and precise manner. This is all the more surprising since, a priori, the use of an interleaver located upstream with respect to mapper 23 does not change the error rate in reception and, therefore, the size of the constellation to use. An element which is apparently irrelevant to the determination of the bit loading shows to be substantially advantageous since it permits to get rid of the known fictitious and approximative calculations.

Further advantages result from the use of interleaver. Indeed, if a GRAY type labeling is combined with this process, i.e. a labeling where only one bit changes between two direct neighbors within the constellation. The computation of the bit loading is facilitated and, further, additional sophisticated computing is rendered feasible, such as the likelihood calculations involved in the use of turbo codes.

It can be seen that the new architecture of modulation/demodulation, which combines the use of an interleaver upstream with respect to the mapper with a bitloading algorithm perfectly fits the use of error correcting codes, and particularly the more sophisticated one. A very efficient modulation system is achieved.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. Modulation process for a digital transmission system with error correcting code and determination of a number of bits to load on a transmission channel, the process comprising:

encoding binary information by means of an encoder;
interleaving the encoded binary information in order to suppress correlation between said information; and
labeling said binary information associated with a gray coding so as to associate the interleaved information with one point of a constellation selected among a set of predefined constellations, said constellation being selected in accordance with a signal to noise ratio measured in reception and also in accordance with a bit error rate $P_{bit}$ at an output of a receiver.

2. Modulation process according to claim 1 wherein the encoder comprises a hard type encoder with a code C(n,k,t) generated over a Galois field of m elements, producing n symbols from k information symbols, and a having a correction power of t, and wherein the selected constellation is chosen as a function of the measurement of the signal to noise ratio and a bit error rate p at an output of a modulator computed as a function of the post-decoding bit error rate $P_{bit}$ at the output of a decoder in accordance with formulas:

$$P_s = 1 - (1-p)^m$$

$$P_d = \sum_{i=t+1}^{n} \frac{i}{n}\binom{n}{i} P_s^i (1-P_s)^{n-i}$$

$$P_{bit} = 1 - (1-P_d)^{\frac{1}{m}}.$$

3. Modulation process in accordance with claim 2 wherein the selection of the constellation is performed by means of a look-up table between p and $P_{bit}$.

4. Modulation process according to claim 2, further comprising several subcarriers for i=1 to n, each of said subcarriers being associated with one constellation which is determined as a function of a maximization of a number of bits to be loaded through said subcarriers, in accordance with a formula below:

$$b_i = \max\left\{1 \le b \le b_{max} : K_b Q\left(\sqrt{\frac{d_b^2 |H_i|_i^2}{2N_i}}\right) \le p\right\},$$

wherein $b_{max}$ is a maximum order of the constellation;

$|H_i|^2/N_i$ is a signal to noise ratio for a subcarrier i;

$d_b^2$ is a squared minimum Euclidian distance between points of the constellation; and $b.K_b$ is an average number of binary errors due to minimum Euclidian distance error events.

5. Modulation process according to claim 2 wherein said encoder uses a C(n,k,t) code with a hard type decoding.

6. Modulation process according to claim 1 wherein said encoder uses a C(n,k) code with soft decoding based on a Galois field with a corresponding soft input maximum likehood decoder, and wherein said constellation is selected as a function of the measurement of the signal to noise ratio in reception and a bit error rate p at the output of a modulator computed from the post-decoding bit error rate $P_{bit}$ at the output of said receiver as follows:

$$P_{bit} \approx \frac{1}{k} Q\left(\sqrt{-2d_{min} \ln p}\right) p^{-d_{min}} \left.\frac{\partial A(W,H)}{\partial W}\right|_{W=1, H=p},$$

$$\text{with } Q(x) = \int_x^{+\infty} \frac{1}{\sqrt{2\pi}} \exp\left(-\frac{t^2}{2}\right) dt,$$

with:

A(W, H) being an input output weight enumerating function (IOWEF); and $d_{min}$ being a minimum Hamming distance between two words of the code.

7. Modulation process according to claim 6 wherein the constellation is determined in accordance with a maximization of a number of bits to load on a corresponding channel, as follows:

$$b_i = \max\left\{1 \le b \le b_{max} : \exp\left(-\frac{d_b^2 |H_i|_i^2}{2N_i}\right) \le p\right\},$$

with:

$b_{max}$ being a maximum order to a constellation;

$|H_i|^2/N_i$ being a signal to noise ratio for a subcarrier i;

$d_b^2$ being a squared minimum Euclidian distance between a points of the constellation; and $b.K_b$ being an average number of binary errors due to minimum Euclidian distance error events.

8. Modulation process according to claim 7 where said encoding uses a turbo-code.

9. Modulation process according to claim 1 where said transmission system has one unique carrier.

10. Modulation process according to claim 1 wherein said transmission system is an orthogonal frequency duplex modulation or a discrete multi-tone communication system.

11. A digital transmission system that uses error correction code and determines a number of bits to load on a transmission channel, the transmission system comprising:

a means for encoding binary information using an encoder;

a means for interleaving the encoded binary information to suppress correlation between the binary information; and a means for labelling the binary information associated with a gray coding to associate the interleaved binary information with one point of a constellation selected among a set of predefined constellations, the constellation being selected in accordance with a signal to noise ratio measured in reception and also in accordance with a bit error rate at a receiver output.

12. The transmission system of claim 11, further comprising a means for using a lookup table to select the constellation.

13. The transmission system of claim 11, further comprising a means for using several subcarriers that are each associated with one constellation, the constellation being determined as a function of a maximization of a number of bits to be loaded through the subcarriers.

14. A digital transmission system that uses error correction code and determines a number of bits to load on a transmission channel, the transmission system comprising:

an encoder to encode binary information;

an interleaver coupled to the encoder to interleave the encoded binary information to suppress correlation introduced by the encoder; and a mapper in cooperation with a bit loading unit to label the binary information associated with a gray coding to associate the interleaved binary information with one point of a constellation selected among a set of predefined constellations, the constellation being selected in accordance with a signal to noise ratio measured in reception and also in accordance with a bit error rate at a receiver output.

15. The transmission system of claim 14 wherein the encoder comprises a hard type encoder.

16. The transmission system of claim 14, further comprising a lookup table that can be used by the mapper in cooperation with the bit loading unit to select the constellation.

17. The transmission system of claim 14 wherein the encoder can use a type of code with a hard type decoding.

18. The transmission system of claim 14 wherein the encoder can use a type of code with soft type decoding.

19. The transmission system of claim 14 wherein the mapper in cooperation with the bit loading unit can select the constellation based on a maximization of a number of bits to load on a corresponding channel.

20. The transmission system of claim 14 wherein the encoder can use a turbo code.

* * * * *